നം

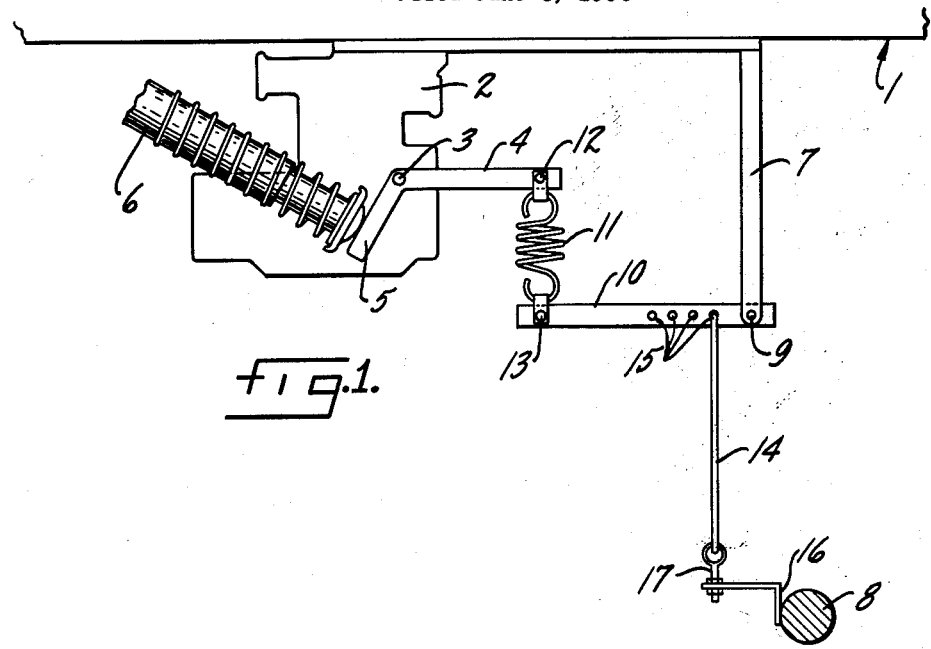
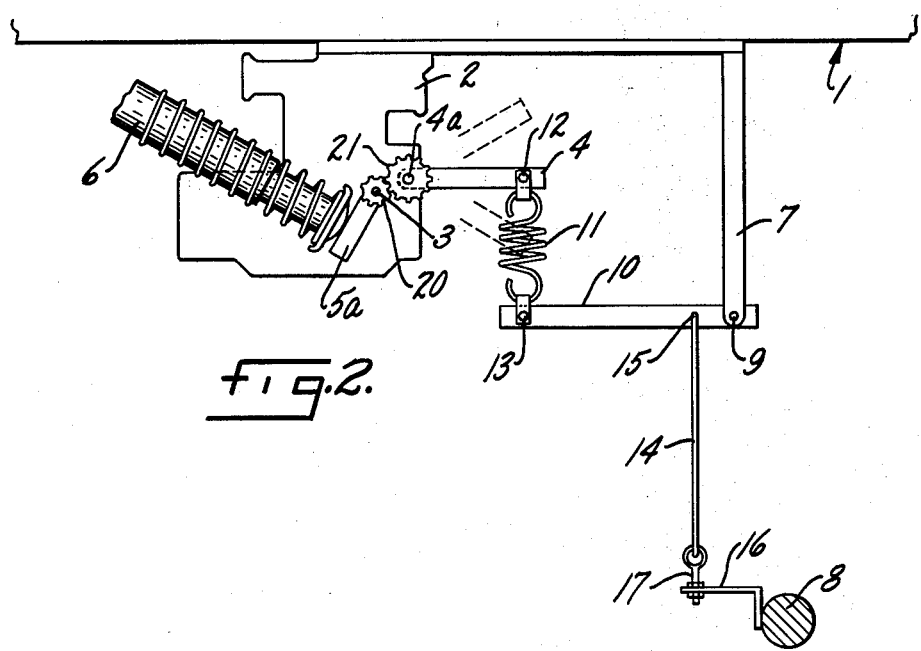

United States Patent Office 3,256,047
Patented June 14, 1966

3,256,047
LOAD MODULATION LINKAGE
Arthur A. Berg, Lincolnwood, and Harold L. Dobrikin, Highland Park, Ill., assignors, by mesne assignments, to Berg Mfg. & Sales Co., Des Plaines, Ill., a corporation of Illinois
Filed June 1, 1964, Ser. No. 371,667
4 Claims. (Cl. 303—22)

This invention relates to the field of vehicles and particularly to the field of truck-trailer combination vehicles. One purpose of the invention is to provide a linkage assembly effective to control the amount of applied brake pressure in relation to the total weight of such vehicles.

Another purpose is to provide a system effective to modulate the pressures applied to the brakes of a truck-trailer vehicle in response to the load carried by said vehicle.

Another purpose is to provide a load-modulated brake pressure supply system.

Another purpose is to provide a linkage assembly effective to vary the ratio between the amount of spring de-between a vehicle axle and a vehicle body into larger control movements in a brake pressure system.

The advent of vehicles of relatively lighter weights has increased the need for control of brake pressures applied to the wheels thereof. With prior, heavier vehicles the differences in the reflection of the springs of the vehicle when loaded and empty were relatively minor. With lighter vehicles a greater pay load may be carried and the differences between an empty and a fully loaded vehicle are accordingly increased. Hence it is one purpose of the invention to provide a mechanism effective to sense the amount of supporting spring deflection caused by the load carried in the trailer.

Another purpose is to provide a linkage assembly effective to vary the ratio between the amount of spring deflection caused by the load placed in the vehicle and the amount of pressure applied to the brakes.

It is another purpose of the invention to provide a linkage effective to sense the effect of deceleration of a vehicle and to vary the amount of brake pressure applied to the wheels of said vehicle in response thereto.

Another purpose is to provide a linkage assembly effective to convert relatively minute variances in vehicle support spring deflection into relatively large movements of a valve-operating arm.

Another purpose is to provide a linkage usable with vehicles having a maximum vehicle support spring-deflection of the order of ¾ inch and to those having a deflection of the order of 2 inches.

Other purposes will appear from time to time during the course of the specification and claims.

The invention is illustrated more or less diagrammatically in the accompanying drawings, wherein:

FIGURE 1 is a side elevation; and
FIGURE 2 is a side elevation illustrating a variant form of the invention.

Like parts are indicated by like numerals throughout the specification and drawings.

Referring now to the drawings, and particularly to FIGURE 1, numeral 1 generally designates a truck or trailer body. Carried by the body 1 is a load-modulation valve 2. It will be understood that the modulation valve 2 is interconnected with the air brake pressure system of the vehicle and that the valve member 2 has internal elements effective to vary the amount of pressure delivered to the brakes in the vehicle. The air pressure system of the vehicle delivers air pressure at a predetermined value to the valve 2 and the valve 2 is effective to vary the amount transmitted thereby to the brakes in the vehicle. An operating element or shaft 3 extends from the valve 2 and has an operating connection (not shown) within the valve 2 with said internal elements thereof. Since the particular elements within the modulation valve 2 form no part of the present invention, the same are not illustrated and will not be further discussed.

An actuating arm 4 is connected to the element 3 of the valve 2. A branch extension 5 of the arm 4 extends beyond the element 3 for contact by a dampener member 6. While the dampener member 6 may take a variety of forms, it has been found effective to provide a type of hydraulic cylinder and spring combination. The member 6 may be suitably supported in any satisfactory manner from the body 1.

A support 7 extends from the body 1 toward a vehicle axle 8. Pivoted adjacent a lower end of the support 7, as at 9, is an adjustment or rock arm 10. A spring 11 is pivotally connected, as at 12, to and adjacent the outer end of the arm 4 and, as at 13, adjacent the outer end of the arm 10 and is effective to absorb road shocks and vibrations. A cable 14 has one of its ends connected to one of a series of longitudinally spaced openings 15 in the arm 10 adjacent to and spaced along the arm 10 from the pivot point 9 of support 7. The opposite end of cable 14 is connected to a bracket 16 secured in any suitable manner to the axle 8. An I-bolt 17 is employed in the connection of cable 14 to bracket 16 for ease in adjustment.

Referring now to FIGURE 2, an alternate form of the invention is shown. Where the parts are identical the same numerals have been employed for convenience and clarity.

In the form of the invention illustrated in FIGURE 2 the shaft 3 extending outwardly from the housing of valve 2 for actuation of internal control elements therein has a branch arm 5a secured thereto. The buffer or dampener mechanism 6 engages the outer free end of the arm 5a. A toothed member, such as the gear 20, is operatively associated with the arm 5a. The arm 4 is pivotally mounted on housing 2 as at 4a and has operatively associated therewith a gear 21. The gears 20, 21 may be secured to arms 5a, 4 in any suitable manner and may include only sufficient teeth to provide for the full movement range of their associated arms. The remainder of the structure, including elements 7–17, corresponds to that disclosed in FIGURE 1 with the exception that the additional spaced openings 15 in arm 10 are not required, and the opposite direction of rotation of shaft 3 in FIGURE 2 is compensated for in valve 2.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:
The effect of load variances on the vehicle body 1 is determined by measuring the distance between the body 1 and the axle 8. Since the conventional springs supporting the body 1 on axle 8 are deflected a given amount by variances in the load carried by body 1, the distance variation may be expressed in terms of spring deflection. A common maximum spring deflection or distance variation between body 1 and axle 8 between completely loaded and empty vehicles reaches a maximum of three-quarter inch. The linkage of the invention is equally usable, however, with vehicles having a maximum support spring deflection of the order of two inches. Hence it will be seen that relatively minute variances are caused by loading of the vehicle 1 at various levels between empty and fully loaded configurations. Similarly, a shift in a center of gravity of the load carried by vehicle body 1 may cause a relatively minute variation in spring deflection. The arm 4, however, is designed for movement of the order of 40 degrees in either direction from that shown, as appears in dotted lines in the drawings. The linkage of the invention is effective to convert such relatively minute changes in spring-deflection, or distances between body 1 and axle 8, into the proper degree of movement of arm 4 to properly control the internal elements of modulation valve 2 and thus to direct the proper amount of brake pressure from the modulation valve 2 to the brakes in the vehicle.

Hence the operator, upon installation of the form of the invention illustrated in FIGURE 1, determines the position of the springs or the distance between body 1 and axle 8 when the vehicle is empty and the amount of spring deflection or the decrease in distance between the body 1 and axle 8 when the vehicle 1 is fully loaded. Upon such determination the operator secures cable 14 to the appropriate opening 15 in the arm 10. If the parts be in the position illustrated in FIGURE 1 when the vehicle is empty, for example, and the first opening 15 adjacent the pivot point 9 be selected as shown, it will be seen that the presence of a load on the body floor 1 will cause a movement of support 7 toward axle 8 and a consequent pivoting of arm 10 raising the outer end thereof, adjacent the pivot 13, and permitting an upward movement of arm 4.

Similarly, with respect to the form of the invention illustrated in FIGURE 2, the operator, having determined the amount of spring deflection or decrease in distance between body 1 and axle 8 produced by applying a full load to an empty vehicle, selects the proper set of gear or toothed elements 20, 21, the ratio of the radii thereof being predetermined for that amount of spring deflection. Once the gears 20, 21 are installed they remain throughout the life of the vehicle. Thus, if the parts be in the position shown in FIGURE 2 when the vehicle is empty and the body 1 moves toward axle 8 upon replacement of a load on body 1, the consequent upward movement of arm 10 causes, through the mediacy of arm 4, a rotation in counterclockwise direction of gear 21 and a consequent movement, at a greater rate, of smaller gear 20 and arm 5a to rotate the shaft 3 and thus to position the elements within modulation valve 2.

There is claimed:

1. For use with a brake pressure system having a control valve effective to vary the pressure to the brakes of said vehicle, an actuating arm extending outwardly from said control valve and having an operating engagement therewith, a rock arm pivotally connected to said vehicle and to the axle of said vehicle adjacent one end of said rock arm, said rock arm having a pivotal engagement with said actuating arm adjacent the opposite end of said rock arm, said operative engagement between said actuating arm and said valve including a set of two toothed elements, the radius of one of said elements being different from the radius of the remainder of said elements.

2. For use with a vehicle having an air pressure brake system, a control valve for said system, a vehicle body and an axle spaced from said body, a load-modulation linkage including a support extending from said body, a rock arm pivotally connected adjacent one of its ends to said support, a member connecting said axle to said rock arm at a point spaced from said support, an actuating arm having an operating engagement with said control valve and a pivotal connection between the opposite end of said rock arm and said actuating arm, said operating engagement including a pair of gear elements, one of said gear elements being secured to said actuating arm, the other of said gear elements being secured to said control valve.

3. For use with a vehicle having an air pressure brake system, a control valve for said system, a vehicle body and an axle spaced from said body, a load-modulation linkage including a support extending from said body, a rock arm pivotally connected adjacent one of its ends to said support, a member connecting said axle to said rock arm at a point spaced from said support, an actuating arm having an operating engagement with said control valve and a pivotal connection between the opposite end of said rock arm and said actuating arm, said operating engagement including a pair of gear elements, one of said gear elements being secured to said actuating arm, the other of said gear elements being secured to said control valve, and a dampener member having an operative engagement with said last-named gear element.

4. For use with a vehicle having an air pressure brake system, a control valve for said system, a vehicle body and an axle spaced from said body, a load-modulation linkage including a support extending from said body, a rock arm pivotally connected adjacent one of its ends to said support, a member connecting said axle to said rock arm at a point spaced from said support, an actuating arm having an operating engagement with said control valve and a pivotal connection between the opposite end of said rock arm and said actuating arm, said operating engagement including a pair of gear elements, one of said gear elements being secured to said actuating arm, the other of said gear elements being secured to said control valve, the radius of said one gear element differing in length from the radius of said other gear element, the ratio of said radii being selected in response to the amount of variance in distance between said body and said axle when said body is empty and loaded.

References Cited by the Examiner

UNITED STATES PATENTS

| | | | |
|---|---|---|---|
| 1,990,517 | 2/1935 | Bedford et al. | |
| 2,270,366 | 1/1942 | Wolf | 303—22 X |
| 2,680,610 | 6/1954 | Harry | 251—54 X |
| 2,987,346 | 6/1961 | Wrigley | 303—22 X |

BENJAMIN HERSH, *Primary Examiner.*

EUGENE G. BOTZ, *Examiner.*

M. S. SALES, *Assistant Examiner.*